(12) United States Patent
Lee et al.

(10) Patent No.: US 8,174,519 B2
(45) Date of Patent: May 8, 2012

(54) LIQUID CRYSTAL DISPLAY AND DRIVING METHOD THEREOF

(75) Inventors: Baek-Woon Lee, Gyeonggi-do (KR); Joon-Hak Oh, Seoul (KR); Keun-Kyu Song, Gyeonggi-do (KR); Cheol-Woo Park, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 689 days.

(21) Appl. No.: 12/189,490

(22) Filed: Aug. 11, 2008

(65) Prior Publication Data

US 2008/0291195 A1 Nov. 27, 2008

Related U.S. Application Data

(63) Continuation of application No. 10/992,248, filed on Nov. 17, 2004, now Pat. No. 7,423,625.

(30) Foreign Application Priority Data

Nov. 18, 2003 (KR) .................. 10-2003-0081539

(51) Int. Cl.
*G09G 5/00* (2006.01)

(52) U.S. Cl. ........ 345/214; 345/204; 345/205; 345/207; 345/209; 345/213

(58) Field of Classification Search ............ 345/87–104, 345/173, 174, 204–214, 694, 58; 349/139, 349/146; 341/144; 350/333, 336; 315/169.4

See application file for complete search history.

(56) References Cited

U.S. PATENT DOCUMENTS

| | | | |
|---|---|---|---|
| 4,812,017 A | 3/1989 | Piper | |
| 5,159,325 A * | 10/1992 | Kuijk et al. ..................... 345/84 |
| 5,303,200 A * | 4/1994 | Elrod et al. .............. 365/230.05 |
| 5,315,101 A * | 5/1994 | Hughes et al. ............. 250/208.1 |
| 5,442,469 A * | 8/1995 | Pitt ................................ 349/51 |
| 5,710,611 A * | 1/1998 | Suzuki et al. ................ 349/129 |
| 5,825,345 A * | 10/1998 | Takahama et al. ........... 345/104 |
| 5,847,684 A * | 12/1998 | Strik ............................... 345/58 |
| 5,923,310 A * | 7/1999 | Kim ............................... 345/90 |
| 6,052,161 A * | 4/2000 | Yamada et al. ................ 349/32 |
| 6,327,008 B1 | 12/2001 | Fujiyoshi | |
| 6,469,684 B1 | 10/2002 | Cole | |
| 6,496,172 B1 | 12/2002 | Hirakata | |

(Continued)

FOREIGN PATENT DOCUMENTS

CN 1156265 8/1997

(Continued)

OTHER PUBLICATIONS

European search report of Feb. 27, 2007.

*Primary Examiner* — Prabodh M Dharia
(74) *Attorney, Agent, or Firm* — Innovation Counsel LLP

(57) ABSTRACT

A liquid crystal display is provided, which includes: a plurality of pixel row groups, each pixel row group including at least one pixel row that includes a plurality of pixels arranged in a matrix and including switching elements; a plurality of gate lines connected to the switching elements and transmitting a gate-on voltage for turning on the switching elements; and a plurality of data lines connected to the switching elements and transmitting data voltages, wherein the switching elements in adjacent pixel row groups are connected to the data lines at opposite sides.

13 Claims, 9 Drawing Sheets

U.S. PATENT DOCUMENTS

| | | | |
|---|---|---|---|
| 6,762,819 B2 * | 7/2004 | Lee | 349/156 |
| 6,794,824 B2 * | 9/2004 | Song et al. | 315/169.4 |
| 6,903,716 B2 * | 6/2005 | Kawabe et al. | 345/99 |
| 2001/0006409 A1 * | 7/2001 | Lee | 349/156 |
| 2001/0038370 A1 | 11/2001 | Yeung | |
| 2002/0080295 A1 | 6/2002 | Someya et al. | |
| 2003/0001812 A1 * | 1/2003 | Lee et al. | 345/94 |
| 2003/0025658 A1 * | 2/2003 | Janssen et al. | 345/87 |
| 2003/0107543 A1 * | 6/2003 | Nakano et al. | 345/90 |
| 2003/0218586 A1 * | 11/2003 | Wu et al. | 345/87 |
| 2004/0090561 A1 | 5/2004 | Song et al. | |
| 2005/0052390 A1 * | 3/2005 | Mochizuki et al. | 345/92 |
| 2005/0083356 A1 * | 4/2005 | Roh et al. | 345/698 |

FOREIGN PATENT DOCUMENTS

| | | |
|---|---|---|
| CN | 1156265 A | 8/1997 |
| CN | 1392528 A | 1/2003 |
| CN | 1444196 A | 9/2003 |
| JP | 04-346390 | 12/1992 |
| JP | 05-134629 | 5/1993 |
| JP | 07-318901 | 8/1995 |
| JP | 11-218736 | 8/1999 |
| JP | 2001-013480 | 1/2001 |
| JP | 2001-042287 | 2/2001 |
| JP | 2001-264818 | 9/2001 |
| JP | 2003-066928 | 3/2003 |
| JP | 2003-216124 | 7/2003 |
| JP | 2003-233362 | 8/2003 |
| KR | 1996-0038721 | 11/1996 |
| KR | 100154832 | 7/1998 |
| KR | 1999-0047243 | 7/1999 |
| KR | 1019990059985 | 7/1999 |
| KR | 10350645 | 8/2002 |
| KR | 100375901 | 2/2003 |
| KR | 1020030030272 | 4/2003 |
| KR | 1020030030718 | 4/2003 |
| KR | 10-2003-0051150 A | 6/2003 |
| KR | 1020030054933 | 7/2003 |
| KR | 1020030058140 | 7/2003 |
| KR | 10-1999-0016186 A | 4/2005 |
| TW | 383529 B | 3/2000 |
| TW | 530291 B | 5/2003 |

\* cited by examiner

LIQUID CRYSTAL DISPLAY AND DRIVING METHOD THEREOF

This application is a continuation of U.S. patent application Ser. No. 10/992,248, filed Nov. 17, 2004, now U.S. Pat. No. 7,423,625, which claims priority to Korean Patent Application Serial No.: 10-2003-0081539 filed on Nov. 18, 2003, the contents which are herein incorporated by references for all purposes.

BACKGROUND OF THE INVENTION 1. (a) Field of the Invention

The present invention relates to a liquid crystal display and a driving method thereof.

2. (b) Description of Related Art

An LCD includes a pair of panels provided with field generating electrodes and a liquid crystal (LC) layer having dielectric anisotropy, which is disposed between the two panels. The field generating electrodes generally include a plurality of pixel electrodes connected to switching elements such as thin film transistors (TFTs) to be supplied with data voltages and a common electrode covering an entire surface of a panel and supplied with a common voltage. A pair of field generating electrodes that generate the electric field in cooperation with each other and a liquid crystal disposed therebetween form so called a liquid crystal capacitor.

The LCD applies the voltages to the field generating electrodes to generate electric field to the liquid crystal layer, and the strength of the electric field can be controlled by adjusting the voltage across the liquid crystal capacitor. Since the electric field determine the orientations of liquid crystal molecules and the molecular orientations determine the transmittance of light passing through the liquid crystal layer, the light transmittance is adjusted by controlling the applied voltages, thereby obtaining desired images.

In order to prevent image deterioration due to long-time application of the unidirectional electric field, etc., polarity of the data voltages with respect to the common voltage is reversed every frame, every row, or every dot.

Among various inversion types, a dot inversion reversing the polarity every given number of pixels reduces vertical crosstalk or vertical flickering due to kickback voltage, thereby improving image quality. However, the polarity inversion of the data voltages flowing in each data line may require complicated driving scheme and may cause signal delay. Although the signal delay may be reduced by employing low resistivity metal, etc., it may complicate the manufacturing process and increase the production cost.

On the contrary, a column inversion reverses the voltage polarity every given number of pixel columns. Since the column inversion does not reverse the polarity of the data voltages applied to each data line during one frame, the issue of the signal delay is remarkably reduced.

However, the column inversion is inferior to the dot inversion in the vertical crosstalk and the vertical flickering, etc.

SUMMARY OF THE INVENTION

A liquid crystal display is provided, which includes: a plurality of pixel row groups, each pixel row group including at least one pixel row that includes a plurality of 10 pixels arranged in a matrix and including switching elements; a plurality of gate lines connected to the switching elements and transmitting a gate-on voltage for turning on the switching elements; and a plurality of data lines connected to the switching elements and transmitting data voltages, wherein the switching elements in adjacent pixel row groups are connected to the data lines at opposite sides.

The switching elements in each pixel row group may be connected to the data lines at the same side.

The data voltages supplied to adjacent pixel row groups through each data line may have opposite polarities.

The data voltages supplied to each pixel row group through each data line may have the same polarity.

Each pixel row group may include first and second pixel rows and the gate-on voltage for the first pixel row may have a duration different from the gate-on voltage for the second pixel row.

The transmission of the gate-on voltage for at least a pixel row of each pixel row group may start after a predetermined time from termination of a previous transmission of the gate-on voltage for any other pixel rows.

The liquid crystal display may further include: a signal controller providing image data; and a data driver converting the image data from the signal controller to the data voltages and applying the data voltages to the data lines, wherein the signal controller outputs at least twice a packet of the image data for at least one pixel row of each pixel row group to the data driver.

The liquid crystal display may further include: a gate driver outputting the gate-on voltage via a plurality of output terminals under the control of the signal controller, wherein the output terminals include first terminals connected to the gate lines and a second terminal disconnected from the gate lines and the output of the gate-on voltage is performed in sequence via the first terminals and the second terminal.

A liquid crystal display is provided, which includes: a plurality of gate lines transmitting gate signals; a plurality of data lines transmitting data voltages; and a plurality of pixel row groups, each pixel row group including at least one pixel row that includes a plurality of pixels including switching elements selectively transmitting the data voltages in response to the gate signals, wherein the switching elements in each pixel row group are connected to the data lines at the same side and the switching elements in adjacent pixel row groups are connected to the data lines at opposite sides The data voltages supplied to adjacent pixel row groups through each data line may have opposite polarities.

The data voltages supplied to each pixel row group through each data line may have the same polarity.

A method of driving a liquid crystal display including a plurality of gate lines, a plurality of data lines, and first and second pixel row groups, each of the first and the second pixel row groups including at least one pixel row that includes a plurality of pixels including switching elements connected to the gate lines and the data lines is provided, which includes: applying first data voltages to the data lines; applying a gate-on voltages to the gate lines connected to the first pixel row group to turn on the switching elements of the first pixel row group such that the first pixel row group is charged with the first data voltages; applying second data voltages having polarity opposite the first voltages to the data lines; and applying a gate-on voltages to the gate lines connected to the second pixel row group to turn on the switching elements of the second pixel row group such that the second pixel row group is charged with the second data voltages, wherein the switching elements in adjacent pixel row groups are connected to the data lines at opposite sides.

BRIEF DESCRIPTION OF THE DRAWINGS

The present invention will become more apparent by describing embodiments thereof in detail with reference to the accompanying drawing in which:

FIGS. 3 to 5B illustrate arrangements of the switching elements of the pixels according to an embodiment of the present invention;

DETAILED DESCRIPTION OF EMBODIMENTS

Figure 1:
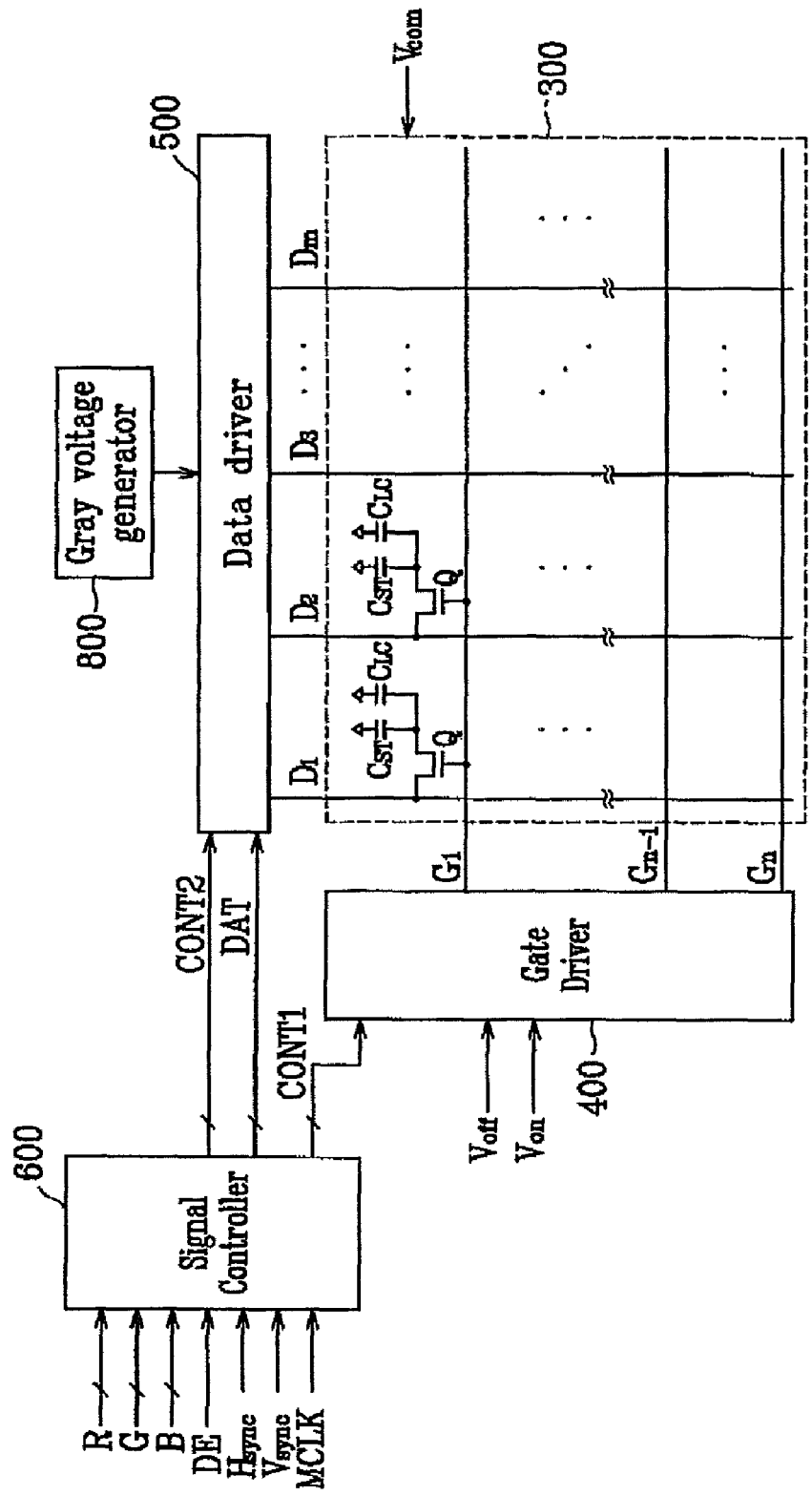
FIG. 1 is a block diagram of an LCD according to an embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein. Like numerals refer to like elements throughout.

In the drawings, the thickness of layers and regions are exaggerated for clarity. Like numerals refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present.

Then, liquid crystal displays according to embodiments of the present invention will be described with reference to the accompanying drawings.

Figure 2:
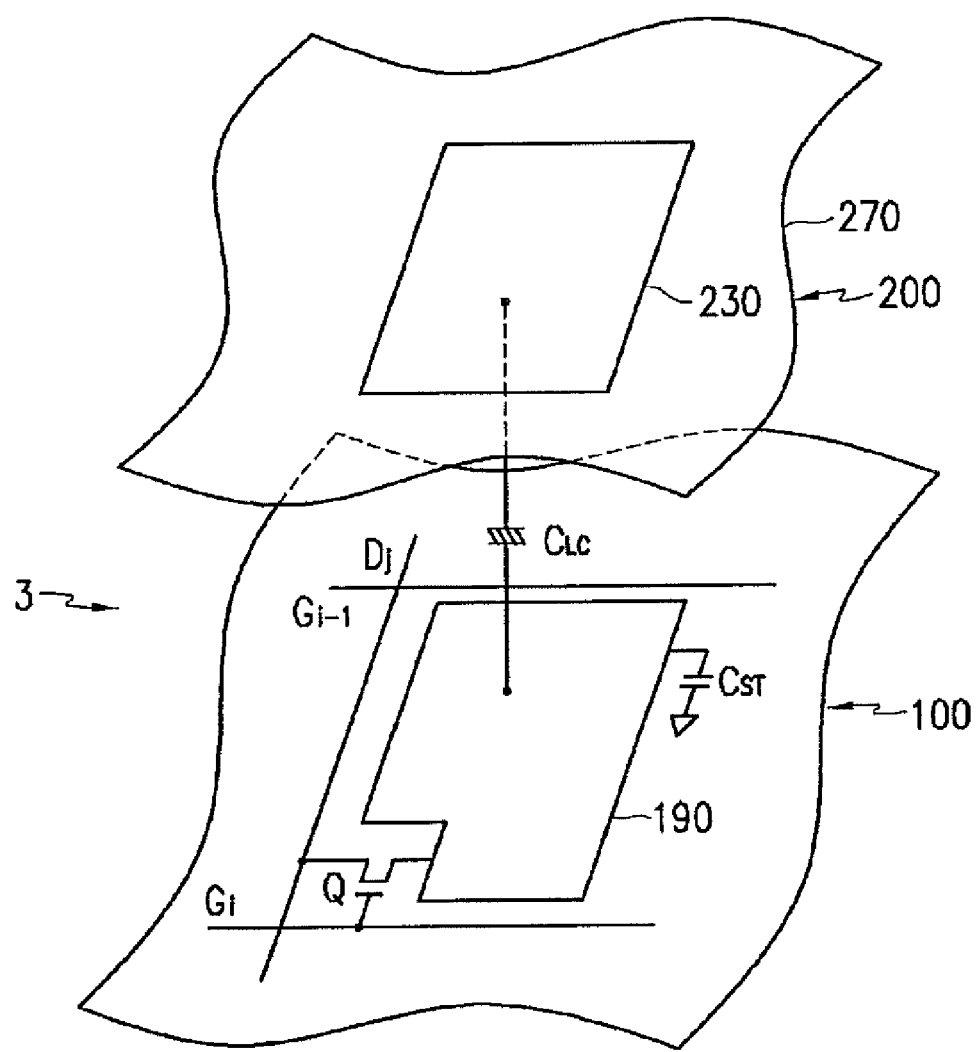
FIG. 2 is an equivalent circuit diagram of a pixel of an LCD according to an embodiment of the present invention.

FIG. 1 is a block diagram of an LCD according to an embodiment of the present invention, and FIG. 2 is an equivalent circuit diagram of a pixel of an LCD according to an embodiment of the present invention.

Referring to FIG. 1, an LCD according to an embodiment includes a LC panel assembly 300, a gate driver 400 and a data driver 500 that are connected to the panel assembly 300, a gray voltage generator 800 connected to the data driver 500, and a signal controller 600 controlling the above elements.

Referring to FIG. 1, the panel assembly 300 includes a plurality of display signal lines $G_1$-$G_n$ and $D_1$-$D_m$ and a plurality of pixels connected thereto and arranged substantially in a matrix. In a structural view shown in FIG. 2, the panel assembly 300 includes lower and upper panels 100 and 200 and a LC layer 3 interposed therebetween.

The display signal lines $G_1$-$G_n$ and $D_1$-$D_m$ are disposed on the lower panel 100 and include a plurality of gate lines $G_1$-$G_n$ transmitting gate signals (also referred to as "scanning signals"), and a plurality of data lines $D_1$-$D_m$ transmitting data signals. The gate lines $G_1$-$G_n$ extend substantially in a row direction and substantially parallel to each other, while the data lines $D_1$-$D_m$ extend substantially in a column direction and substantially parallel to each other.

Each pixel includes a switching element Q connected to the signal lines $G_1$-$G_n$ and $D_1$-$D_m$, and a LC capacitor $C_{LC}$ and a storage capacitor $C_{ST}$ that are connected to the switching element Q. If unnecessary, the storage capacitor $C_{ST}$ may be omitted.

The switching element Q including a TFT is provided on the lower panel 100 and has three terminals: a control terminal connected to one of the gate lines $G_1$-$G_n$; an input terminal connected to one of the data lines $D_1$-$D_m$; and an output terminal connected to both the LC capacitor $C_{LC}$ and the storage capacitor $C_{ST}$.

The LC capacitor $C_{LC}$ includes a pixel electrode 190 provided on the lower panel 100 and a common electrode 270 provided on an upper panel 200 as two terminals. The LC layer 3 disposed between the two electrodes 190 and 270 functions as dielectric of the LC capacitor C $C_{LC}$. The pixel electrode 190 is connected to the switching element Q, and the common electrode 270 is supplied with a common voltage Vcom and covers an entire surface of the upper panel 200. Unlike FIG. 2, the common electrode 270 may be provided on the lower panel 100, and both electrodes 190 and 270 may have shapes of bars or stripes.

The storage capacitor $C_{ST}$ is an auxiliary capacitor for the LC capacitor $C_{LC}$. The storage capacitor C.sub.ST includes the pixel electrode 190 and a separate signal line, which is provided on the lower panel 100, overlaps the pixel electrode 190 via an insulator, and is supplied with a predetermined voltage such as the common voltage Vcom. Alternatively, the storage capacitor $C_{ST}$ includes the pixel electrode 190 and an adjacent gate line called a previous gate line, which overlaps the pixel electrode 190 via an insulator.

In a planar view, a pixel is assigned to an area enclosed by a pair of adjacent gate lines $G_1$-$G_n$ and a pair of adjacent data lines $D_1$-$D_m$, and the switching elements Q of each pixel is connected to one of upper and lower gate lines $G_1$-$G_n$ and to one of left and right data lines $D_1$-$D_m$.

FIGS. 3 to 5B illustrate arrangements of the switching elements of the pixels according to an embodiment of the present invention, i.e., the connections between the switching elements denoted by x and the gate lines $G_1$-$G_n$ and the data lines $D_1$-$D_m$.

Figure 3:
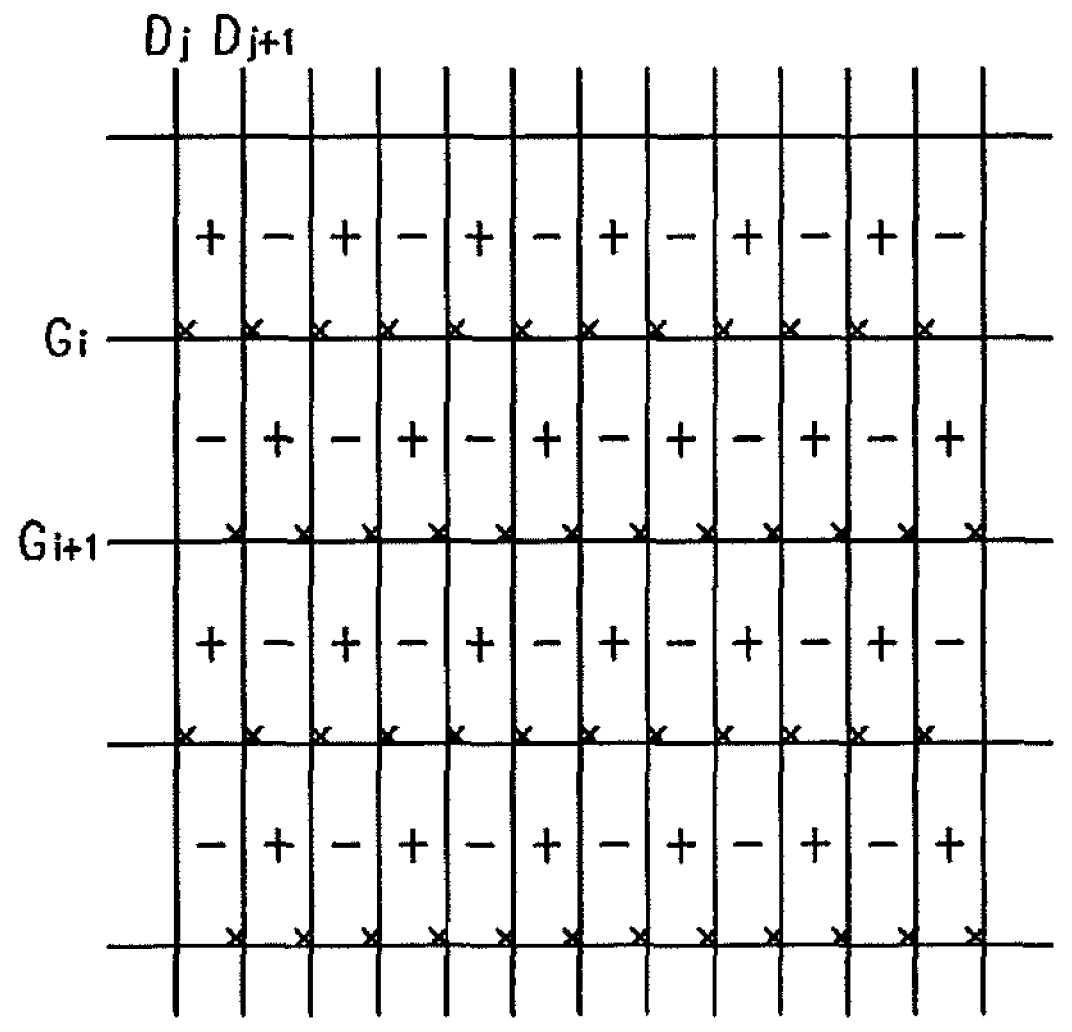

FIGS. 3 to 5B show arrangements that connect the switching elements of all the 5 pixels are connected to lower gate lines $G_1$-$G_n$. On the contrary, all the switching elements may be connected to upper gate lines $G_1$-$G_n$. All the switching elements in each pixel row are connected to the data lines $D_1$-$D_m$ disposed at the same side. For example, all the switching elements in the uppermost pixel row shown in FIG. 3 are connected to the left data lines $D_1$-$D_m$, while all the switching elements in the lowermost pixel row shown in FIG. 4A are connected to the right data lines $D_1$-$D_m$.

The arrangement shown in FIG. 3 alternates the positions of the switching elements every row. In other words, the switching elements in adjacent pixel rows are connected to opposite-sided data lines $D_1$-$D_m$. Among four pixel rows shown in FIG. 3, the switching elements in the uppermost and the third pixel rows are connected to the left data lines $D_1$-$D_m$, while the switching elements in the second and the lowermost pixel rows are connected to the right data lines $D_1$-$D_m$.

Figures 4A, 4B:
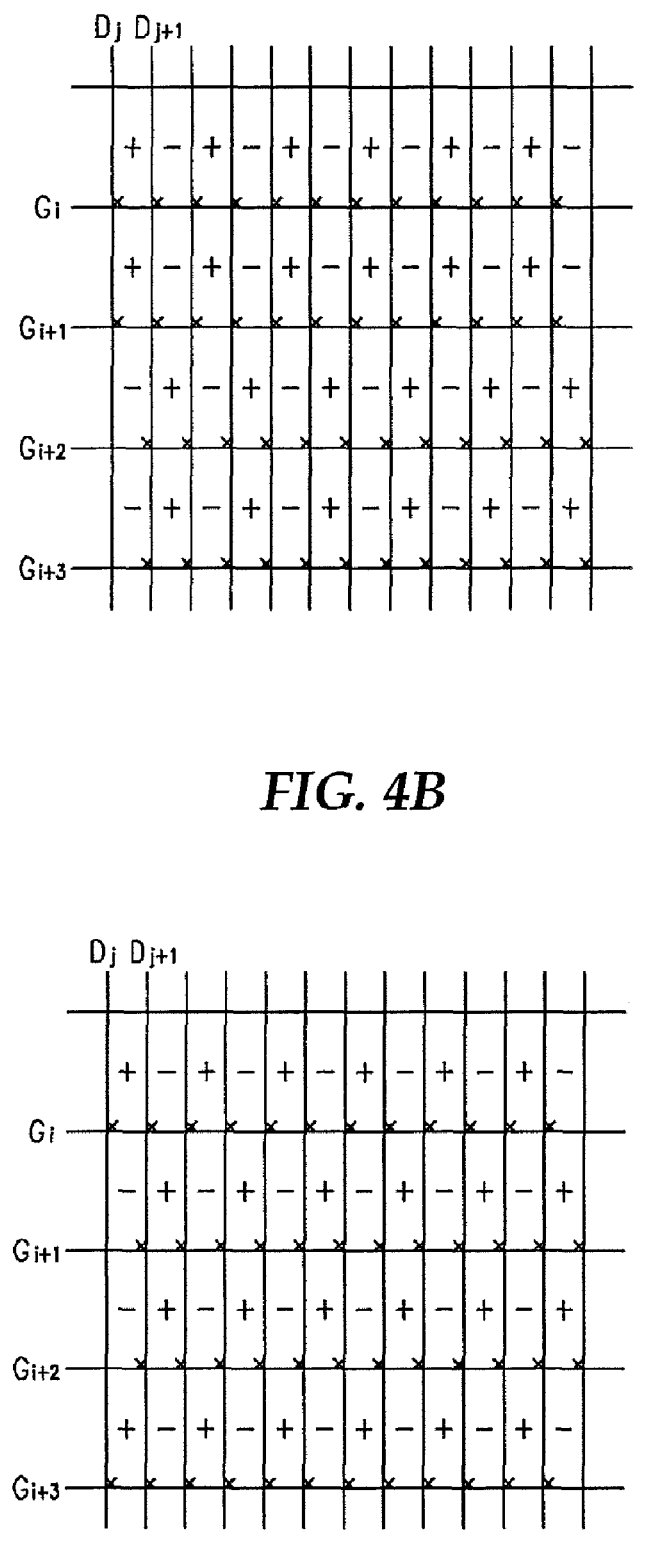

In the arrangements shown in FIGS. 4A and 4B, the positions of the switching elements alternate every two pixel rows. In other words, the switching elements in a group of pixel rows (referred to as "pixel row group" hereinafter) including successive two pixel rows occupy the same position, and the switching elements in successive two pixel row groups occupy opposite positions. It is noted that the uppermost or the lowermost pixel row in a LC panel assembly 300 may solely form a pixel row group. Among four pixel rows shown in FIG. 4A, the switching elements in the first pixel row group including upper two pixel rows are connected to the left data lines $D_1$-$D_m$, while the switching elements in the second pixel row group including lower two pixel rows are connected to the right data lines $D_1$-$D_m$. Among four pixel rows shown in FIG. 4B, the switching elements in the first pixel row group including the uppermost pixel row and those in the third pixel row group including the lowermost pixel row are connected to the left data lines $D_1$-$D_m$, while the switching elements in the second pixel row group including the second and the third pixel row groups are connected to the right data lines $D_1$-$D_m$.

The positions of the switching elements may alternate every three pixel rows. To summarize, the arrangements of the switching elements shown in FIGS. 3 to 4B make the switching elements in each pixel row group, which includes at least a pixel row, occupy the same position and make the switching elements in adjacent pixel row groups occupy the opposite positions.

In the arrangement shown in FIG. 5A, the switching elements in a predetermined number of successive pixel rows (referred to as "pixel row set" hereinafter) 101 and 102 form the same configuration as that shown in FIG. 3, and the arrangements in two adjacent pixel row sets 101 and 102 are symmetrical with respect to a boundary of the pixel row sets 101 and 102. In the arrangement shown in FIG. 5B, the switching elements in each pixel row set 103 and 104 form the same configuration as that shown in FIG. 4A, and the arrangements in two adjacent pixel row sets 101 and 102 are also symmetrical with respect to a boundary of the pixel row sets 101 and 102. The number of the pixel row sets is at least one, and the arrangement having only one pixel row set is equal to the arrangement shown in FIG. 3 or 4A.

For color display, each pixel uniquely represents one of primary colors (i.e., spatial division) or each pixel sequentially represents the primary colors in turn (i.e., temporal division) such that spatial or temporal sum of the primary colors are recognized as a desired color. An example of a set of the primary colors includes red, green, and blue colors. FIG. 2 shows an example of the spatial division that each pixel includes a color filter 230 representing one of the primary colors in an area of the upper panel 200 facing the pixel electrode 190. Alternatively, the color filter 230 is provided on or under the pixel electrode 190 on the lower panel 100.

The red, green and blue color filters 230 shown in FIGS. 3 to 5B in a pixel row are arranged in sequence and a pixel column includes the pixels representing only one color, thereby forming a striped arrangement.

One or more polarizers (not shown) are attached to at least one of the panels 100 and 200.

Referring to FIG. 1 again, the gray voltage generator 800 generates two sets of a plurality of gray voltages related to the transmittance of the pixels. The gray voltages in one set have a positive polarity with respect to the common voltage Vcom, while those in the other set have a negative polarity with respect to the common voltage Vcom.

The gate driver 400 is connected to the gate lines $G_1$-$G_n$ of the panel assembly 300 and synthesizes the gate-on voltage Von and the gate-off voltage Voff from an external device to generate gate signals for application to the gate lines $G_1$-$G_n$.

The data driver 500 is connected to the data lines $D_1$-$D_m$ of the panel assembly 300 and applies data voltages, which are selected from the gray voltages supplied from the gray voltage generator 800, to the data lines $D_1$-$D_m$.

The drivers 400 and 500 may include at least one integrated circuit (IC) chip mounted on the panel assembly 300 or on a flexible printed circuit (FPC) film in a tape carrier package (TCP) type, which are attached to the LC panel assembly 300. Alternately, the drivers 400 and 500 may be integrated into the panel assembly 300 along with the display signal lines $G_1$-$G_n$ and $D_1$-$D_m$ and the TFT switching elements Q.

The signal controller 600 controls the gate driver 400 and the gate driver 500.

Now, the operation of the above-described LCD will be described in detail.

The signal controller 600 is supplied with input image signals R, G and B and input control signals controlling the display thereof such as a vertical synchronization signal Vsync, a horizontal synchronization signal Hsync, a main clock MCLK, and a data enable signal DE, from an external graphics controller (not shown). After generating gate control signals CONT1 and data control signals CONT2 and processing the image signals R, G and B suitable for the operation of the panel assembly 300 on the basis of the input control signals and the input image signals R, G and B, the signal controller 600 transmits the gate control signals CONT1 to the gate driver 400, and the processed image signals DAT and the data control signals CONT2 to the data driver 500.

The gate control signals CONT1 include a scanning start signal STV for instructing to start scanning and at least a clock signal for controlling the output time of the gate-on voltage Von. The gate control signals CONT1 may further include an output enable signal OE for defining the duration of the gate-on voltage Von.

The data control signals CONT2 include a horizontal synchronization start signal STH for informing of start of data transmission for a group of pixels, a load signal LOAD for instructing to apply the data voltages to the data lines $D_1$-$D_m$, and a data clock signal HCLK. The data control signal CONT2 may further include an inversion signal RVS for reversing the polarity of the data voltages (with respect to the common voltage Vcom).

Responsive to the data control signals CONT2 from the signal controller 600, the data driver 500 receives a packet of the image data DAT for the group of pixels from the signal controller 600, converts the image data DAT into analog data voltages selected from the gray voltages supplied from the gray voltage generator 800, and applies the data voltages to the data lines $D_1$-$D_m$.

The gate driver 400 applies the gate-on voltage Von to the gate line $G_1$-$G_n$ in response to the gate control signals CONT1 from the signal controller 600, thereby turning on the switching elements Q connected thereto. The data voltages applied to the data lines $D_1$-$D_m$ are supplied to the pixels through the activated switching elements Q.

The difference between the data voltage and the common voltage Vcom is represented as a voltage across the LC capacitor $C_{LC}$, which is referred to as a pixel voltage. The LC molecules in the LC capacitor $C_{LC}$ have orientations depending on the magnitude of the pixel voltage, and the molecular orientations determine the polarization of light passing through the LC layer 3. The polarizer(s) converts the light polarization into the light transmittance.

By repeating this procedure by a unit of the horizontal period (which is denoted by "1H" and equal to one period of the horizontal synchronization signal Hsync and the data enable signal DE), all gate lines $G_1$-$G_n$ are sequentially supplied with the gate-on voltage Von during a frame, thereby applying the data voltages to all pixels. When the next frame starts after finishing one frame, the inversion control signal RVS applied to the data driver 500 is controlled such that the polarity of the data voltages is reversed (which is referred to as "frame inversion").

Other than the frame inversion, the data driver 500 varies the polarity of the data voltages flowing in each data line during one frame, thereby varying the polarity of the pixel voltages. Since the connections between the pixels and the data lines are various as shown in FIGS. 3 and 5B, the polarity inversion pattern generated by the data driver 500 is different from that of the pixel voltages appearing on the panel assembly 300. Hereinafter, the polarity inversion of the data driver 500 is referred to as "driver inversion" and the polarity inversion appearing on the panel assembly 300 is referred to as "apparent inversion."

Now, several inversion types according to embodiments of the present invention will be described in detail with reference to FIGS. 3 to 5B.

FIGS. 3 to 4B show cases that the driver inversion is a column inversion that the polarity of the data voltages in each data line is fixed and the polarities of the data voltages in adjacent data lines are opposite.

Referring to FIG. 3, the apparent inversion is 1.times.1 dot inversion since the positions of the switching elements are interchanged every pixel row. Similarly, the apparent inversion shown in FIGS. 4A and 4B are 2.times.1 dot inversion since the positions of the switching elements are interchanged every two pixel rows.

Figure 5A:
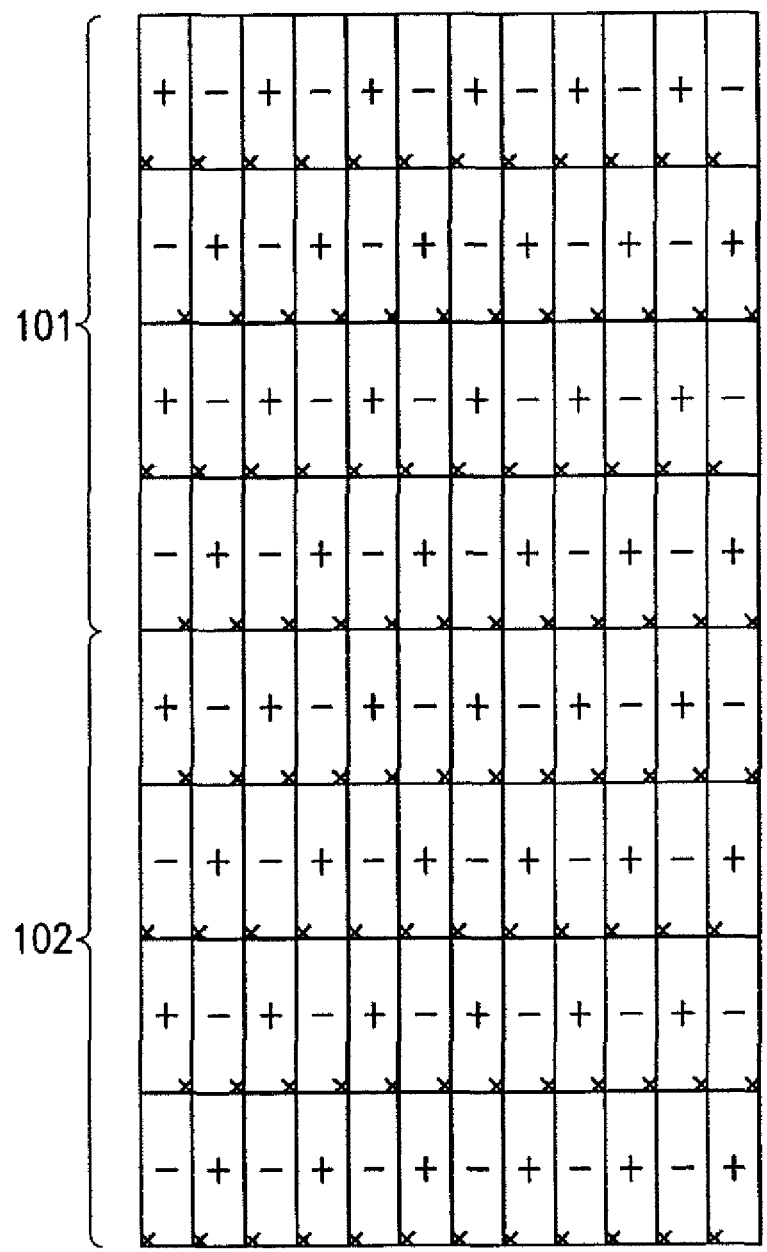
Figure 5B:
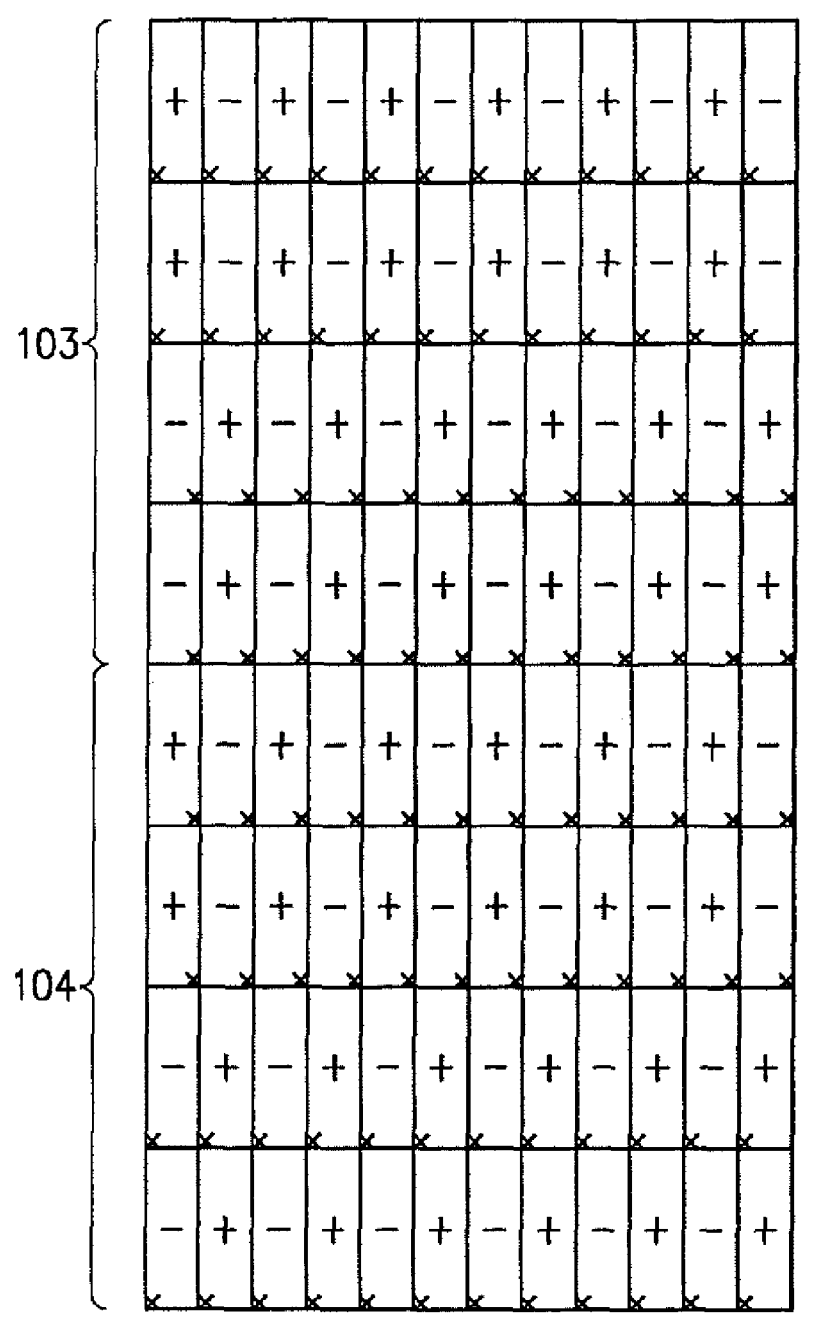

The driver inversion employed in the arrangements shown in FIGS. 5A and 5B is a kind of dot inversion, where the data voltages in adjacent data lines have opposite polarities and the data voltages in each data line are reversed every pixel row set. (Since a pixel row set form a section on a screen of the panel assembly 300, the above-described inversion is referred to as "sectional inversion" hereinafter and the term "section" will be used in the same meaning as the term "pixel row set.") That is, two data voltages applied to each data line have the same polarity if they will be applied to the pixels belonging to a pixel row set. However, the data voltages have opposite polarities if they will be applied to the pixels belonging to adjacent pixel rows. Therefore, when the number of the pixel rows in a pixel row set is equal to M, the above-described inversion is said to be M.times.1 dot inversion.

Under such a driver inversion, the apparent inversion shown in FIG. 5A becomes 1.times.1 dot inversion like FIG. 3, while the apparent inversion shown in FIG. 5B becomes 2.times.1 dot inversion like FIG. 4A.

The dot-type apparent inversion disperses the difference in the luminance due to the kickback voltages between the positive-polarity pixel voltages and the negative-polarity pixel voltages to thereby reduce vertical line defect.

Figure 6A:
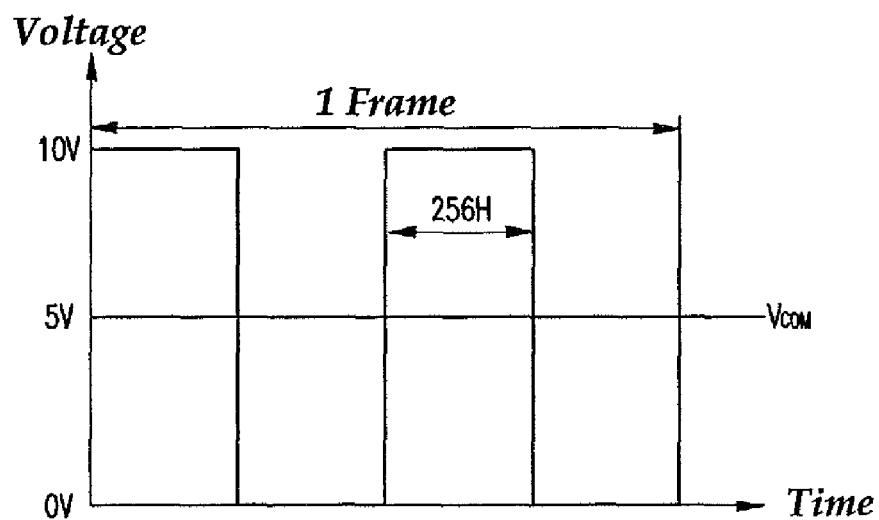
FIGS. 6A to 6C show waveforms of a black data voltage applied to a data line of a normally white mode LCD.
Figure 6B:
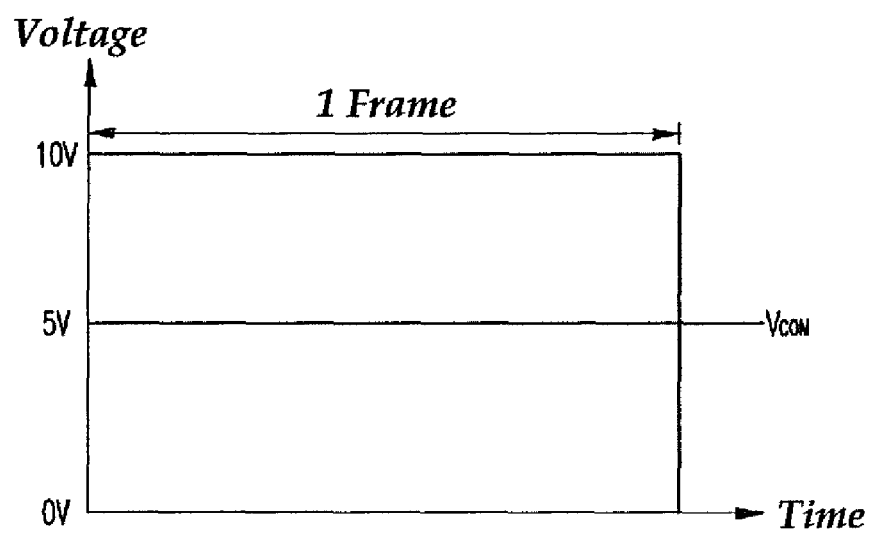
Figure 6C:
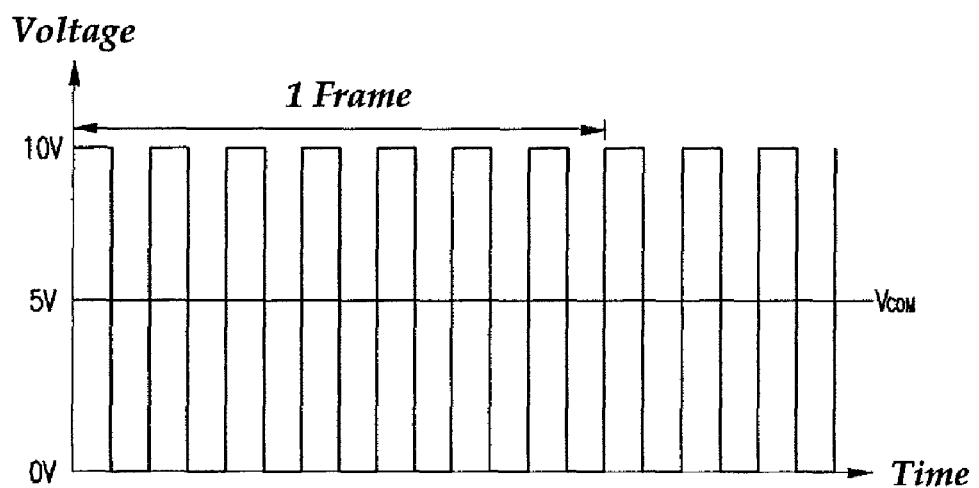

FIGS. 6A to 6C show waveforms of a black data voltage applied to a data line of a normally white mode LCD. FIGS. 6A and 6B are related to a sectional driver inversion with four sections and one section, respectively, and FIG. 6C is related to a 1.times.1 dot-type driver inversion.

The polarity of the data voltage shown in FIG. 6A is reversed four times in a frame, while the polarity for a 1.times.1 dot-type driver inversion shown in FIG. 6C is reversed once in a frame. The inversion shown in FIG. 6B is equivalent to a column inversion since the number of the section is only one and the polarity of the data voltages is not reversed during a frame.

When the data voltages flowing in a data line in a frame have opposite polarities as describe above, a vertical crosstalk is reduced. In particular, the inversion approaches to a normal dot inversion as the number of the sections increases, thereby increasingly reducing the vertical crosstalk. However, the increase of the number of the sections may cause the increase of signal delay and power consumption and thus the number of the sections is preferably in a range of 1-32. The reason for the reduction of the crosstalk will be described later in detail.

In the meantime, the section inversion may cause the delay of data voltages for the first pixel row in each section since the polarity of the data voltages for the first pixel row is opposite to the polarity of the data voltages for a previous pixel row. Such a signal delay may be reduced by increasing the charging time of the data voltages for the first pixel row of each section or by starting the charging of the data voltages for the first pixel row of each section after delaying the charging for a time until the voltages of the data lines are greater than a predetermined level. Since the application of the data voltages in an LCD is performed in a unit of one horizontal period and the increased charging time or the delay time may be multiples of one horizontal period.

Figure 7A:
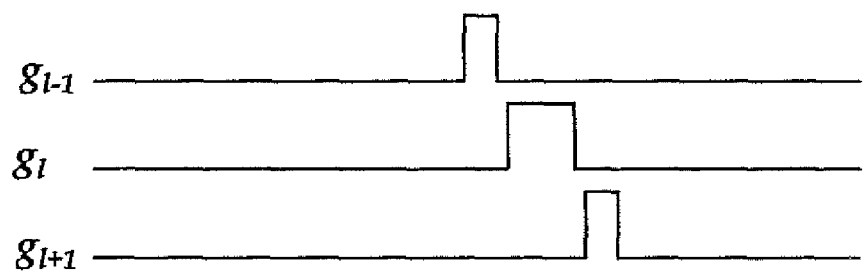
FIGS. 7A and 7B illustrate gate signals in an LCD according to embodiments of the present invention.
Figure 7B:
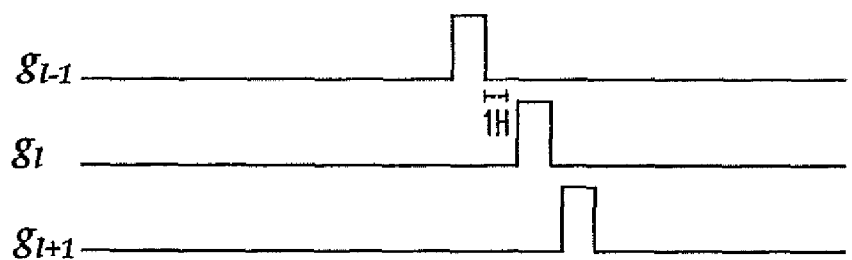

FIGS. 7A and 7B illustrate gate signals in an LCD according to embodiments of the present invention. In FIGS. 7A and 7B, the gate signal for the first pixel row of a section is denoted as $g_1$.

Referring to FIG. 7A, the gate signal g1 applied to a gate line connected to the first pixel row has an increased duration of the gate-on voltage Von, for example, for a time twice a conventional one. For this purpose, the signal controller 600 may double the duration of a pulse of a clock signal, which is supplied to the gate driver 400 for controlling the output time of the gate-on voltage Von, for the gate signal $g_1$.

Referring to FIG. 7B, the gate-on voltage of the gate signal $g_1$ for the first pixel row is delayed for a time, for example, for 1H, such that the charging into the pixels starts when the voltages of the data lines reach a predetermined level.

In order to delay the gate signal $g_1$ for 1H, the l-th gate signal outputted from the gate driver 400 is abandoned and the (l+1)-th gate signal is applied to the l-th gate line $G_l$. This is obtained by connecting the (l+1)-th output terminal of the gate driver 400 to the gate line $G_l$ and connecting the l-th output terminal of the gate driver 400 to none.

In the examples shown in FIGS. 7A and 7B, the signal controller 600 provides the data driver 500 with the image data for the first pixel rows of the sections twice in a successive manner such that the data lines hold the data voltages for the first pixel row of each section for 2H. However, since such a successive provision is not required for the first pixel row of the first section, total number of the pixel rows to be twice provided with the image data is equal to (k−1) when the number of the sections is equal to k. The signal controller 600 may include (k−1) line memories for storing the image data for such pixel rows.

Alternatively, an external device such as a sealer for transmitting the image data from an external signal source to the signal controller 600 may include (k−1) line memories.

The additional time or the delay time of the gate-on voltage Von may be varied to 2H, etc., depending on the delay level of the data voltages.

As described above, the section inversion applied to the LCD reduces the vertical crosstalk, which will be described in detail.

Generally, the vertical crosstalk is generated by the voltage variation of pixel electrodes due to the parasitic capacitance between the pixel electrodes and data lines adjacent thereto or due to the leakage current of turned-off switching transistors.

Figure 8:
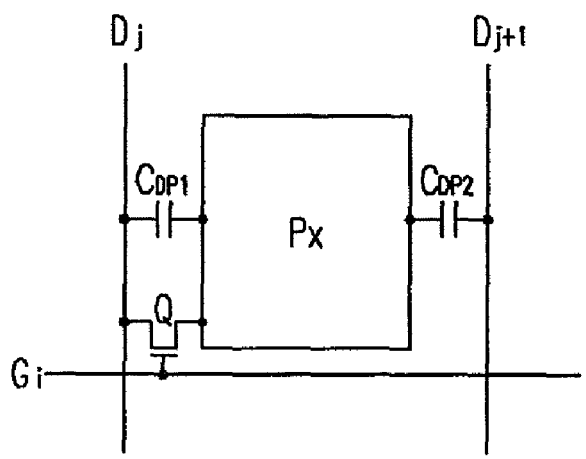
FIG. 8 is an equivalent circuit diagram of a pixel, gate lines and data lines.

Referring to FIG. 8, a voltage variation of a pixel electrode due to the parasitic capacitance between the pixel electrode and data line is described in detail.

FIG. 8 is an equivalent circuit diagram of a pixel, gate lines and data lines.

Referring to FIG. 8, a pixel electrode Px is connected to a gate line $G_1$ and a data line $D_j$ through a transistor Q. Parasitic capacitors $C_{DP1}$ and $C_{DP2}$ are formed between the pixel electrode Px and two data lines $D_j$ and $D_{j+1}$ adjacent thereto. The capacitors and their capacitances are denoted as the same reference characters.

A voltage variation ΔV of the pixel electrode Px due to the parasitic capacitances $C_{DP1}$ and $C_{DP2}$ between the pixel electrode Px and the data line $D_j$ and $D_{j+1}$ is given by:

$$\Delta V = \frac{C_{DP1}(V1 - V1') + C_{DP2}(V2 - V2')}{C_{LC} + C_{ST} + C_{GS} + C_{DP1} + C_{DP2}}, \qquad (1)$$

where V1 and V2 denote voltages of the data lines $D_j$ and $D_{j+1}$ when the pixel electrode Px are charged, respectively, V1' and V2' denote voltages of the data lines $D_j$ and $D_{j+1}$ after the pixel electrode Px are charged, respectively, $C_{GS}$ denotes parasitic capacitance between gate and source of the transistor Q, $C_{LC}$ denotes liquid crystal capacitance, and $C_{ST}$ denotes storage capacitance.

It is assumed that the LCD is subjected to a column inversion and that the data voltages in the data lines $D_j$ and $D_{j+1}$ represent the same gray.

Since (V2−Vcom)=−(V1−Vcom) and (V2'−Vcom)=−(V1'−Vcom), it is satisfied that (V2−V2')=−(V1−V1'). Accordingly, Equation 1 is expressed as:

$$\Delta V = \frac{\Delta C_{DP}(V1 - V1')}{C_{LC} + C_{ST} + C_{GS} + C_{DP1} + C_{DP2}}, \qquad (2)$$

Where $\Delta C_{DP} = C_{DP1} - C_{DP2}$

In the meantime, the voltage variation ΔV due to the leakage current is given by:

$$\Delta V = \frac{I\!o\!f\!f \times t}{C_{LC} + C_{ST} + C_{GS} + C_{DP1} + C_{DP2}},$$

where t is a time for applying data voltages to the data line $D_j$, which is different from the voltage charged in the pixel electrode Px, and Ioff is a leakage current between the pixel electrode Px and the data line $D_j$. The leakage current Ioff is positive or negative depending on the sign of the voltage difference between the pixel electrode Px and the data line $D_j$.

According to the embodiments of the present invention, the polarity of the data voltages is reversed every section. Therefore, the voltage difference between the data line $D_j$ and the pixel electrode Px alternates between positive and negative, and thus the voltage variation due to the parasitic capacitance between the pixel electrode and the data line alternates between negative and positive to be cancelled. In addition, the alternating voltage difference alternates the leakage current Ioff between positive and negative to be also cancelled. Accordingly, the polarity inversion of the data voltages exceedingly reduces the voltage variation ΔV of the pixel electrode Px, thereby greatly reducing the vertical crosstalk.

The above-described arrangements of the switching elements of the pixels realize an N.times.1 dot-type apparent inversion for a given column-type driver inversion. The column-type driver inversion diversifies materials available for the data lines and thus it is easy to find a material suitable for simplifying the manufacturing process. In addition, the charging time for the data voltages into the pixels is increased to improve the response time of the LCD, and the width of the data lines can be reduced to increase the aperture ratio since the signal delay is insignificant. Furthermore, the increase of the variation of the contact resistance between the data lines and other devices may not cause significant signal delay that may generate vertical line defect, and the increase of the resistance of the data lines due to repair of the data lines may not cause a significant problem. Moreover, the loss of the data voltage due to the signal delay is decreased to reduce the power consumption, thereby reducing the heat dissipation of driving devices.

In addition, the section inversion with appropriately defined sections significantly reduces the vertical crosstalk to improve the image quality of the LCD.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A liquid crystal display comprising:
a plurality of pixels arranged in a matrix and including switching elements;
a plurality of gate lines connected to the switching elements and transmitting a gate-on voltage for turning on the switching elements; and
a plurality of data lines connected to the switching elements and transmitting data voltages,
wherein all pixel rows divide into first to $m_{th}$ pixel row groups including an equal number of l pixel rows,
the switching elements in each pixel row are connected to the same sides of their corresponding data lines, the switching elements in the nth pixel row of a first pixel row group are connected to the opposite sides of their corresponding data lines as the switching elements in the nth pixel row of a second pixel row group adjacent to the first pixel row group, and within each pixel row group, the switching elements of alternating pixel rows are connected to alternating sides of the corresponding data lines,
l, n and m are integers, and
n is smaller than m,
wherein the switching elements of each pixel row group are disposed substantially symmetrically with respect to a boundary between the pixel row groups, the boundary extending in a same direction as the pixel rows.

2. The liquid crystal display of claim 1, wherein the data voltages supplied to each pixel row group through each data line have the same polarity.

3. The liquid crystal display of claim 1, wherein the gate-on voltage fir the first pixel row among the m pixel rows has a different duration from the gate-on voltages for the other pixel row.

4. The liquid crystal display of claim 1, wherein the transmission of the gate-on voltage for the first pixel row among the m pixel rows starts after a predetermined time from termination of a previous transmission of the gate-on voltage for any other pixel row.

5. The liquid crystal display of claim 1, wherein the pixel row groups include pixel rows with switching elements connected to the data lines on the opposite side.

6. The liquid crystal display of claim 5, wherein data lines connected to the switching elements are changed every row or every other row.

7. The liquid crystal display, of claim 1, further comprising:
a signal controller providing image data; and
a data driver converting the image data from the signal controller to the data voltages and applying the data voltages to the data lines.

8. The liquid crystal display of claim 7, further comprising:
a gate driver outputting the gate-on voltage via a plurality of output terminals under the control of the signal controller,
wherein the output terminals include first terminals connected to the gate lines and a second terminal disconnected from the gate lines and the output of the gate-on voltage is performed in sequence via the first terminals and the second terminal.

9. A method of driving a liquid crystal display including a plurality of gate lines, a plurality of data lines, and first to $m_{th}$ pixel row groups, each of the first to $m_{th}$ pixel row groups including an equal number of l pixel rows which include a plurality of pixels including switching elements connected to the gate lines and the data lines, the method comprising:
applying data voltages with a first polarity to the data lines with applying gate-on voltages to the gate lines of the $n_{th}$ pixel row groups, and
applying data voltages with a second polarity to the data lines with applying gate-on voltages to the gate lines of the $(n+1)_{th}$ pixel row groups,
wherein l, n and m are integers,
n is smaller than m, and
when a positive data voltage is applied to one data line in the data voltages with the first polarity, a negative data voltage is applied to the data line in the data voltages with the second polarity,
wherein the switching elements in each pixel row are connected to the same sides of their corresponding data lines, the switching elements in the nth pixel row of a first pixel row group are connected to the opposite sides of their corresponding data lines as the switching elements in the nth pixel row of a second pixel row group adjacent to the first pixel row group, and within each pixel row group, the switching elements of alternating pixel rows are connected to alternating sides of the corresponding data lines, and
wherein the switching elements of each pixel row group are disposed substantially symmetrically with respect to a boundary between the pixel row groups, the boundary extending in a same direction as the pixel rows.

10. The method of driving a liquid crystal display of claim 9, wherein the pixel row groups include pixel rows with switching elements connected to the data lines on the opposite side.

11. The method of driving a liquid crystal display of claim 9, wherein polarities of voltages applied to the data lines in the first polarity or the second polarity are not changed until the termination of the transmission of the gate-on voltage for $n_{th}$ or $(n+1)_{th}$ pixel row groups.

12. The method of driving a liquid crystal display of claim 9, wherein the gate-on voltage for the first pixel row of the $(n+1)_{th}$ pixel row groups has a duration different from the gate-on voltage for the other pixel row.

13. The method of driving a liquid crystal display of claim 9, wherein the transmission of the gate-on voltage for the first pixel row of the $(n+1)_{th}$ pixel row group starts after a predetermined time from the termination of a transmission of the gate-on voltage for $n_{th}$ pixel row group.

* * * * *